United States Patent [19]

Soulard

[11] Patent Number: 4,639,179
[45] Date of Patent: Jan. 27, 1987

[54] DEVICE FOR LOADING A MACHINE FOR THE TREATMENT, NOTABLY THERMAL, OF CYLINDRICAL OBJECTS, NOTABLY IN GLASS, SUCH AS GLASS PIPES

[75] Inventor: Dominique Soulard, Gauville, France

[73] Assignee: Societe Francaise d'Ampoules Mecaniques, Aumale, France

[21] Appl. No.: 618,363

[22] Filed: Jun. 7, 1984

[30] Foreign Application Priority Data

Jun. 14, 1984 [FR] France ............... 83 09801

[51] Int. Cl.⁴ .............................. B65H 1/00
[52] U.S. Cl. .................. 414/223; 198/478.1; 198/575; 414/24; 414/745
[58] Field of Search ............... 65/239, 227, 241, 87, 65/176, 187, 260, 279; 414/223, 224, 222, 745, 744 A, 24; 198/575, 478.1; 29/786, 809, 822

[56] References Cited

U.S. PATENT DOCUMENTS

| | | | |
|---|---|---|---|
| 2,878,620 | 3/1959 | Calehuff et al. | 414/744 A |
| 3,737,020 | 6/1973 | Bauman | 198/486 X |
| 3,792,991 | 2/1974 | Couquelet | 414/24 X |
| 4,446,960 | 5/1984 | Zavner et al. | 414/745 X |
| 4,523,673 | 6/1985 | Vessey et al. | 198/575 X |

FOREIGN PATENT DOCUMENTS

| | | | |
|---|---|---|---|
| 569470 | 7/1958 | Belgium | 414/112 |
| 1467577 | 1/1965 | France . | |
| 151271 | 11/1979 | Japan | 414/745 |

Primary Examiner—Robert J. Spar
Assistant Examiner—Jonathan D. Holmes
Attorney, Agent, or Firm—Wenderoth, Lind & Ponack

[57] ABSTRACT

A device for loading a machine for the treatment, notably thermal-mechanical, of elongated cylindrical objects, notably of glass, such as glass pipes, the machine including a carrousel comprising a plurality of stations for the treatment provided by the machine, includes a loading barrel which surmounts the machine, coaxially thereof, and is rotated during loading of the machine, at the same speed as the machine. The barrel can be uncoupled from the machine in order to be resupplied with objects such as glass pipes.

6 Claims, 3 Drawing Figures

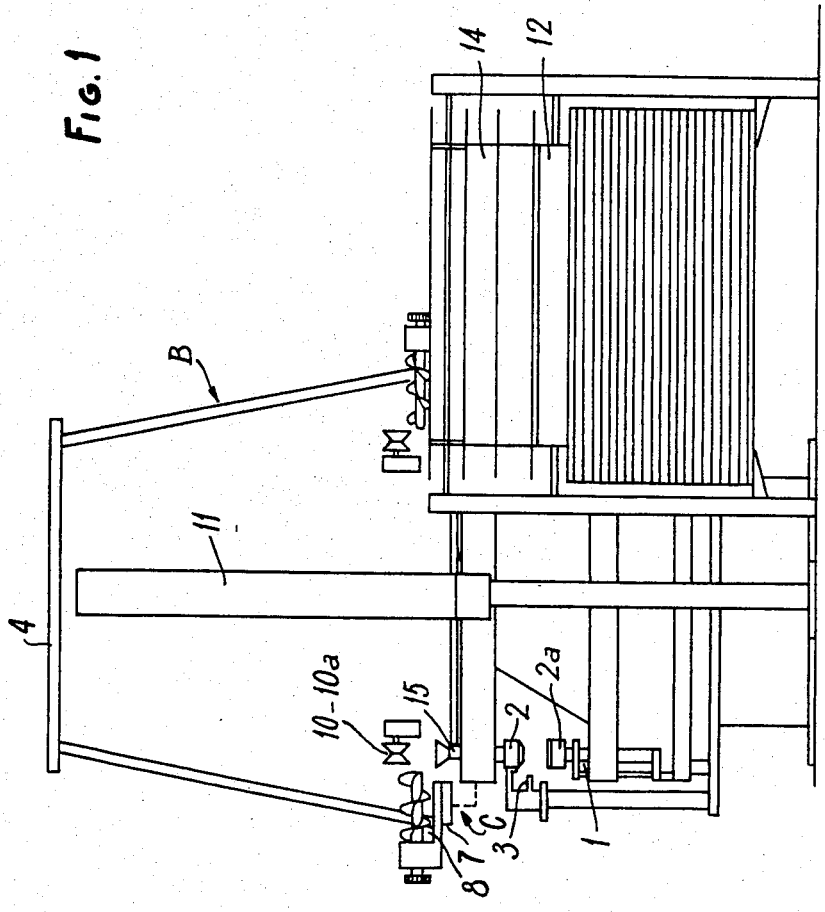

DEVICE FOR LOADING A MACHINE FOR THE TREATMENT, NOTABLY THERMAL, OF CYLINDRICAL OBJECTS, NOTABLY IN GLASS, SUCH AS GLASS PIPES

BACKGROUND OF THE INVENTION

The present invention is directed to an improved device for the automatic loading, during operation, of a machine for the treatment, notably for the thermal treatment, of objects of elongated and cylindrical shape, notably of glass objects such as glass pipes. The device according to the invention is to be used more particularly for the feeding of glass pipes to a machine operable to form from said pipes ampullae for pharmaceutical products.

Such a machine has the configuration of a carrousel revolving at an angular speed which is often very high and which comprises a number of "stations" which have to be supplied with at least one glass pipe to be treated. The loading of such a machine during operation thereof causes problems, and this all the more since the objects which have to be loaded are of a fragile nature.

The known solutions of this problem use devices such as chain, belt or equivalent conveyors, which are outside the machine and forward the glass pipes tangentially to the machine.

Such known device do not give full satisfaction due to the speed, very high, at which the transfer of the glass pipes has to be made from the loading device to the machine to be loaded.

SUMMARY OF THE INVENTION

This invention provides an efficient solution to this problem and includes a device made of a loading barrel provided on the machine coaxially thereof and rotated, while loading, at the same speed as the machine. The barrel is disconnected from the machine when it is to be supplied with glass pipes.

According to the invention, the barrel is made of two superimposed coaxial crowns between which are placed the glass pipes to be transferred to the machine.

The upper crown has stations, of a number equal to the number of the machine stations, provided with means for maintaining the glass pipes, once introduced into the stations, in correct positions therein.

The lower crown includes loading channels, of a number equal to the number of the machine stations to be supplied, in each of which is a radially oriented sprial conveyor.

The supply of the glass pipes to the loading barrel advantageously is performed, according to the invention, by means of an automatic system comprising means for withdrawing the glass pipes from a magazine where they are in a horizontal position and positioning them upright so that they can be placed in the barrel so as to be transferred therefrom to the machine.

BRIEF DESCRIPTION OF THE DRAWINGS

The various features and advantages of the invention will become more apparent from the following description of one of its possible embodiments, given only by way of a nonlimiting example.

In the course of this description, reference is made to the accompanying drawings wherein:

FIGS. 1 and 2 are schematic views, at 90° relative to each other, of a machine for the treatment of glass pipes provided with a device according to the invention.

DETAILED DESCRIPTION OF THE INVENTION

Figure 3:
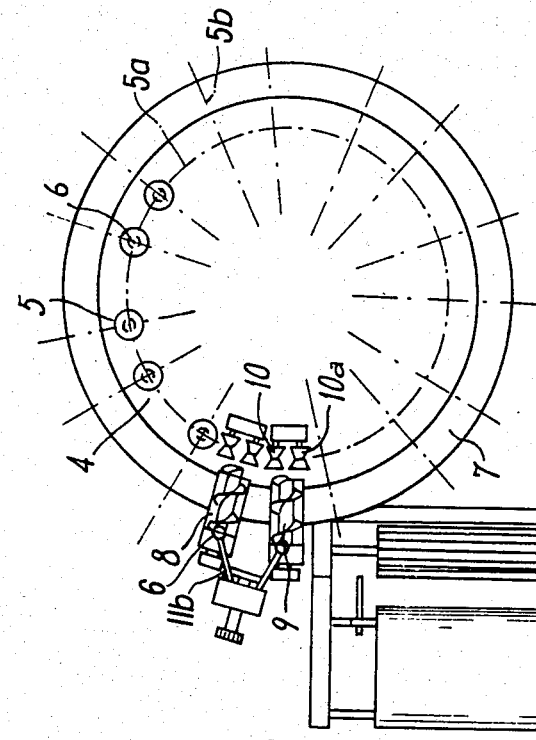
FIG. 3 is a sectional view taken along the line III—III of FIG. 2.

The example chosen relates to a machine for the thermal-mechanical treatment of glass pipes with a view to fabricating medical ampullae. However, it shold be appreciated that the device according to the invention can be used with any other machine of the same type providing objects of the same type but for another application.

A machine of the type in consideration, designated generally in the accompanying drawings by reference A, is made of a carrousel including a number of stations 1. At each of said stations, a glass pipe to be treated is seized by an upper fixed mandrel 2 and a lower mandrel 2a movable downwardly in the machine. The glass pipe which is seized by the mandrels is subjected to the action of burners 3 and is drawn by moving the lower mandrel 2a down.

The glass pipes with which machine A has to be supplied while operating, and while revolving at a speed which can be relatively high, are, according to the invention, automatically transferred to the machine by a loading barrel designated as a whole by reference B.

According to the invention, barrel B is placed above machine A and coaxially thereto. Barrel B can be driven in rotation in synchronism with machine A, at the right moment, by any convenient means, and barrel B includes a number of loading stations equal to the number of stations 1.

In the example shown, the loading barrel B includes:

an upper crown 4 in which are provided openings or housings 5 for receiving upper ends of the glass pipes, the number of housings 5 corresponding to the number of the stations 1 of machine A. Housings 5, provided for receiving glass pipes 6, include means such as springs, for maintaining the glass pipes in position in their respective housings;

a lower crown 7 comprising loading channels 8, the number of which is equal to that of the pipes to be loaded, and each of which is provided with a spiral conveyor 9 used for the introduction of the glass pipes forwarded to the loading channels under conditions which will be explained hereafter.

The loading barrel is moved so as to rotate freely on the upper portion of machine A, and once supplied with glass pipes, it is coupled to the machine A by any appropriate coupling means such as a clutch, shown schematically at C.

Each loading channel 8 opens to a device for lowering the respective glass pipe toward the machine A. In the illustrated example, such device is a pair of diabolo bobbins or rollers 10, 10a between which the glass pipe is introduced from channel 8. The rollers are arranged to clamp therebetween the glass pipe arriving from the feeding channel 8, and they are rotated to lower the glass pipe to the respective station 1 of machine A.

The supply of glass pipes to the loading barrel can be carried out in different ways. For example, such supply can be provided by means of a loading buffer made of an endless chain bringing the glass pipes to the barrel, either continuously or according to any rhythm or sequence required. The loading buffer is itself supplied either from a sheet of horizontal glass pipes with the assistance of a mechanism setting them upright and placing them on the chain, or from a vertical loader.

Figure 2:
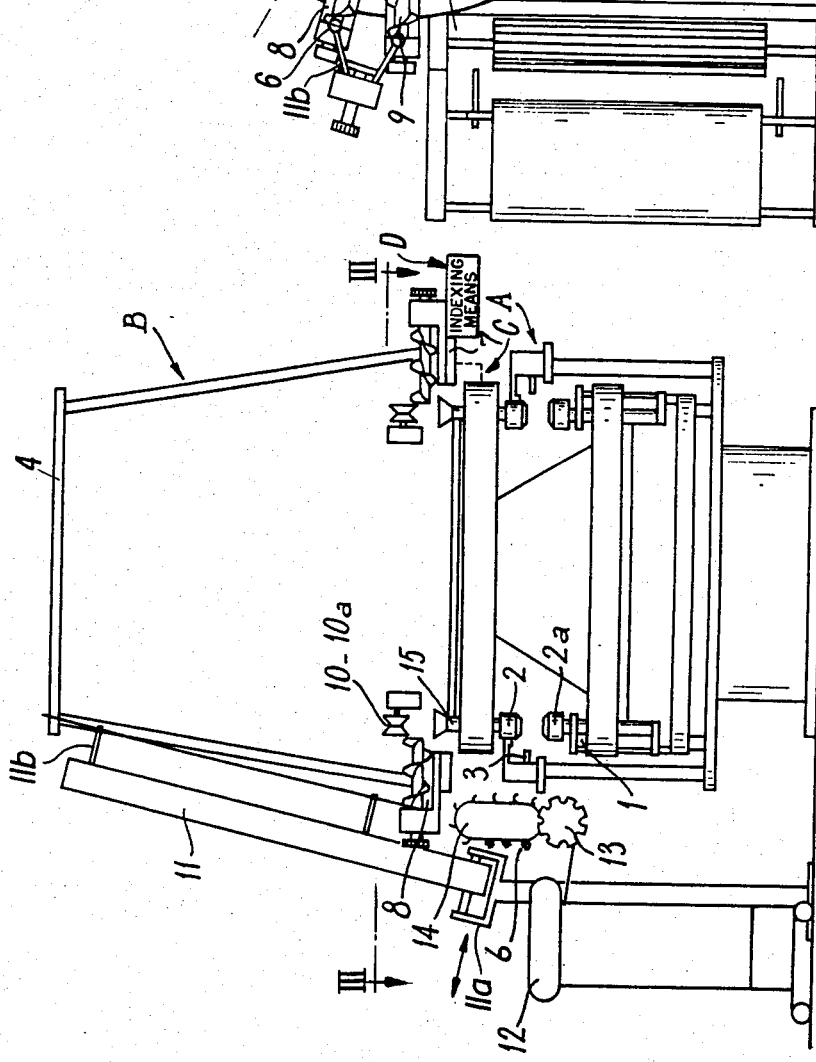

Such a supply can also be provided, as is the case of the illustrated example, by means of an automatic loader, shown schematically at 11, which receives the pipes, forwarded from a magazine 12 and a distributor 13 to a chain 14 in a horizontal position, positions them substantially upright by pivoting the loader from a horizontal position to an inclined position, and places their upper ends in the respective housings 5, distributed along the circumference shown by 5a in FIG. 3 at equidistant radial positions shown by the radial lines 5b in FIG. 3, of the barrel upper crown 4 as the barrel is indexed by suitable indexing means shown schematically at D in FIG. 2 and their lower ends in the respective feeding channels 8. Automatic loader 11 includes an arm having at a lower end thereof a support member 11a which is movable in the directions of the double-headed arrow in FIG. 2. The arm also has clamp members 11b which grasp the tube 6 while they are moved to the inlet ends of channels 8.

The operation of a device according to the invention is as follows:

Once the glass pipes are in the above described position in the loading barrel, the barrel B is connected by a clutch to the machine A and thus rotates coaxially therewith.

The rollers 10, 10a are pressed against the glass pipes and set in rotation. The glass pipes then move down through ducts 15 which bring the pipes to mandrels 2, 2a of machine A.

The rollers then are retracted and rotation thereof is stopped, and the barrel is uncoupled from the machine A in order to be supplied with further glass pipes.

Obviously, the various cycles and sequences of the machine and of its loading barrel can be controlled by suitable means responsive to the condition of the machine, advantageously by programming.

I claim:

1. In a system for treating elongated cylindrical objects, particularly glass objects such as glass pipes, said system being of the type including an object treating machine comprising a carrousel rotatable about a vertical axis and having therearound a plurality of treatment stations whereat the objects are received and treated, and means for supplying objects to be treated to said stations while said carrousel is rotating about said vertical axis, the improvement wherein said supplying means comprises:

a loading barrel mounted above said carrousel for rotation about a vertical axis coaxial with said vertical axis of said carrousel, said barrel having therearound a number of loading stations equal to the number of treatment stations of said carrousel;

coupling means for connecting said barrel to said carrousel to rotate therewith at the same speed during a loading operation, and for disconnecting said barrel from said carrousel during a supplying operation;

indexing means for rotating said barrel to supply said objects to respective loading stations;

means for, when said barrel is disconnected from said carrousel, supplying objects in substantially vertical alignment to said loading stations; and means for, when said barrel is connected to said carrousel, discharging the loaded objects vertically downwardly from said loading stations to respective said treatment stations.

2. The improvement claimed in claim 1, wherein said barrel comprises upper and lower superposed coaxial crown members for supporting upper and lower ends of the objects during supply thereof to said loading stations.

3. The improvement claimed in claim 2, wherein said upper crown member has therein a number of housings equal to said number of treatment stations for receiving upper ends of the objects.

4. The improvement claimed in claim 3, wherein said lower crown member has a number of loading channels equal to said number of treatment stations for receiving lower ends of the objects, and each said channel has therein a spiral conveyor for moving radially inwardly an object lower end deposited on said channel.

5. The improvement claimed in claim 4, wherein said discharging means comprises a plurality of pairs of rollers, each said pair of rollers positioned radially inwardly of a respective said spiral conveyor for receiving therefrom a lower end of an object and for controlling vertical downward movement thereof to a respective said treatment station.

6. The improvement claimed in claim 5, further comprising a plurality of vertical guide ducts, each said guide duct positioned vertically between a respective said pair of rollers and a respective said treatment station.

* * * * *